United States Patent
Deaconu et al.

(10) Patent No.: US 10,616,851 B2
(45) Date of Patent: Apr. 7, 2020

(54) COORDINATION OF SUBSCRIBER REGISTER ENTRIES

(71) Applicant: Telefonaktiebolaget LM Ericsson (publ), Stockholm (SE)

(72) Inventors: Florin Alexandru Deaconu, Eschweiler (DE); Kostas Kouridakis, Athens (GR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/060,311

(22) PCT Filed: Dec. 11, 2015

(86) PCT No.: PCT/EP2015/079499
§ 371 (c)(1),
(2) Date: Jun. 7, 2018

(87) PCT Pub. No.: WO2017/097384
PCT Pub. Date: Jun. 15, 2017

(65) Prior Publication Data
US 2018/0368094 A1    Dec. 20, 2018

(51) Int. Cl.
*H04W 60/06* (2009.01)
*H04W 60/04* (2009.01)
(Continued)

(52) U.S. Cl.
CPC .......... *H04W 60/04* (2013.01); *H04W 8/04* (2013.01); *H04W 8/08* (2013.01); *H04W 8/18* (2013.01); *H04W 60/06* (2013.01)

(58) Field of Classification Search
CPC ... H04W 60/04; H04W 60/06; H04W 60/005; H04W 8/04; H04W 8/06; H04W 8/08; H04W 8/18
See application file for complete search history.

(56) References Cited

U.S. PATENT DOCUMENTS

| | | | |
|---|---|---|---|
| 2002/0087575 A1 | 7/2002 | Papadimitriou et al. | |
| 2012/0157093 A1* | 6/2012 | Zhu | H04W 60/00 455/433 |
| 2013/0044709 A1* | 2/2013 | Adjakple | H04W 76/15 370/329 |

FOREIGN PATENT DOCUMENTS

| | | |
|---|---|---|
| EP | 2472950 A1 | 7/2012 |
| EP | 2763491 A1 | 8/2014 |
| KR | 20020041663 A * | 6/2002 |

OTHER PUBLICATIONS

Unknown, Author, "Further discussion on CSFB with ISR", 3GPP TSG SA WG2 #89, S2-120825 Revision of S2-120739, Vancouver, Canada, Feb. 6-10, 2012, 1-26.

* cited by examiner

*Primary Examiner* — Said M Elnoubi
(74) *Attorney, Agent, or Firm* — Patent Portfolio Builders, PLLC

(57) ABSTRACT

A system, method, node and computer program for coordinating subscriber registration entries (150) of a subscriber in two subscriber location registers, a subscriber location register in a MSC (220), and a subscriber location register in a packet control node (200), is presented. The subscriber is registered into the subscriber location register in the MSC (220) via the packet control node (200). The method comprises determining, by one of the two subscriber location registers, a trigger condition for modifying a subscriber registration entry (150) in that one subscriber location register. If the trigger condition is met, modifying the subscriber registration entry (150) in that one subscriber location register and sending a notification of this subscriber registration entry (150) modification to the other subscriber location register. The method further comprises to receive, by the other subscriber location register, the notification of (Continued)

this subscriber registration entry (150) modification and to modify the subscriber registration entry (150) in the other subscriber location register.

19 Claims, 9 Drawing Sheets

(51) Int. Cl.
*H04W 8/04* (2009.01)
*H04W 8/08* (2009.01)
*H04W 8/18* (2009.01)

COORDINATION OF SUBSCRIBER REGISTER ENTRIES

TECHNICAL FIELD

The present invention relates to telecommunications and in particular to a system, method, node and computer program for coordinating subscriber registration entries of a subscriber in two subscriber location registers.

BACKGROUND ART

A location register is a typical component of a control node such as MME (Mobility Management Entity), SGSN (Serving GPRS Support Node), or MSC (Mobile Switching Centre). A subscriber using a UE (user equipment) attaches to a control node (or multiple control nodes simultaneously) via a radio access network. When attaching for the first time, the location registers inside the control node(s) establish a subscriber registration entry for that subscriber.

The subscriber registration entry logs the current status of the subscriber in respect of her attachment. So if a registration status is "attached", the subscriber is reachable via the radio access network. Typically, this attachment status is confirmed periodically via mobility procedures such as tracking area update, routing area update, or location area update. If such periodic update is not received, the attachment status is automatically changed to implicitly detach. So it is assumed that the subscriber is not reachable anymore. This may happen if the UE loses radio contact for a longer period, for example if the UE is placed in a location without radio coverage (cellar, remote area), or if the battery is suddenly removed. During the period of implicitly detach, the subscriber registration entry is retained, in order to be prepared if radio coverage is suddenly restored.

If, however, the subscriber and her related UE leave the area controlled by the control node while having no radio contact, the subscriber registration entry may stay in that location registers inside that control node.

Furthermore, a subscriber may be forced deleted by operation and maintenance commands. This may be done by operation and maintenance commands directed to the control node itself, or by forced deletion in the central subscriber database such as HLR (Home Location Register) or HSS (Home Subscriber Server).

The latest radio technology LTE (Long Term Evolution) does not have support for the traditional CS (circuit-switched) services such as telephony. Support for telephony in LTE is achieved via a function called CSFB (CS-Fallback). CSFB is a procedure for enabling to fallback from a first Radio Access Technology (RAT) such as the Evolved UMTS Terrestrial Radio Access Network (E-UTRAN) using LTE to a second RAT such as GERAN or UTRAN for originated and terminated CS telephony calls.

In brief, CSFB permits in an Evolved Packet System (EPS) the provisioning of telephony CS domain services by re-use of CS infrastructure when the UE is served by E-UTRAN. A CSFB-enabled UE, connected to E-UTRAN, may thus use $2^{nd}$ or $3^{rd}$ Generation (2G or 3G) technologies such as GERAN or UTRAN to connect to the CS domain.

When the UE is served by LTE via E-UTRAN, the UE cannot directly perform the required mobility procedures towards the MSC. In this case the SGs-interface between the MME and the MSC is used for mobility management procedures between EPS and the CS domain.

A similar mechanism is defined as combined mobility procedures between SGSN and MSC, and the interface is called Gs-interface.

In both scenarios there is the situation that there are two (temporary or also called visited) subscriber location registers, the first one being in the MME/SGSN, the second one being in the MSC, and the subscriber has a subscriber registration entry in both of them. The UE is registered into the MSC via the MME/SGSN.

Since the two subscriber registration entries belong to the same UE, the same subscriber, and the subscriber registration entry in the MSC is generated via the MME/SGSN, it is essential that these two subscriber registration entries are coordinated to show the same registration state. This is needed in order to terminate calls or short messages to the correct interface and to avoid an increase of signalling if the subscriber has changed registration state in one of the two control nodes.

This is however not possible with the mechanisms provided by today's procedures defined for the SGs-interface or Gs-interface, resulting into the problem that in many situations an attachment state mismatch occurs.

SUMMARY

There is a clear need for a coordination of subscriber registration entries of a subscriber in the two subscriber location registers located in the MME/SGSN and in the MSC.

Such coordination is needed for at least the following scenarios:

Automatic Deregistration after Timer Expiry

In order to clean up the location registers, a timer supervises the validity of the subscriber registration entry. If a subscriber registration entry is in implicitly detach state for a longer period of time, the subscriber registration entry is automatically deleted and the subscriber becomes deregistered.

Manual Deregistration by Operation and Maintenance Command

When the operator of the control node issues an operation and maintenance command to delete a subscriber from the location register, the subscriber registration entry is deleted and the subscriber becomes deregistered.

Cancel Location Triggered Deregistration after Operation and Maintenance Command in the HLR/HSS When the operator of the central database (HLR or HSS) issues an operation and maintenance command to delete a subscriber from the HLR/HSS, the HLR/HSS informs its related control node to delete also its related subscriber registration entry and the subscriber becomes deregistered. So the HSS informs the MME, and the HLR informs the MSC or SGSN.

Periodic Routing Area Update (RAU)/Periodic Tracking Area Update (TAU) in MME/SGSN The UE periodically performs mobility procedures such as tracking area update, or routing area update, to confirm the current location of the UE. The subscriber registration entry in the MSC needs to be updated accordingly in order to prevent that the subscriber registration entry in the MSC becomes marked as implicitly detached.

MME/SGSN Implicit Detach

A timer supervises if a UE misses to inform periodically on its current location. If the timer expires, the subscriber registration entry in the MME/SGSN is marked as implicitly detached, and the subscriber registration entry in the MSC needs to be updated accordingly.

The above scenarios are just examples of scenarios where a coordination of subscriber registration entries of a subscriber in the two subscriber location registers located in the MME/SGSN and in the MSC are needed. Such coordination is the object of this invention and this object is achieved by the independent claims. Advantageous embodiments are described in the dependent claims.

According to a first aspect of the invention, a method, in a packet control node for coordinating subscriber registration entries of a subscriber in a subscriber location register in the packet control node and a subscriber location register in a Mobile Switching Centre, MSC, wherein the subscriber is registered into the subscriber location register in the MSC via the packet control node. The method comprises to determine a trigger condition for modifying a subscriber registration entry in the subscriber location register in the packet control node; and wherein if the trigger condition is met, to modify the subscriber registration entry and to send a notification of this subscriber registration entry modification to the subscriber location register in the MSC. The method further comprises to receive a notification of a subscriber registration entry modification from the subscriber location register in the MSC and to modify the subscriber registration entry in the packet control node accordingly.

According to a further aspect of the invention, a method in a Mobile Switching Centre, MSC, for coordinating subscriber registration entries of a subscriber in a subscriber location register in the MSC and a subscriber location register in a packet control node, wherein the subscriber is registered into the subscriber location register in the MSC via the packet control node. The method comprises to determine a trigger condition for modifying a subscriber registration entry in the subscriber location register in the MSC, wherein if the trigger condition is met, to modify the subscriber registration entry and to send a notification of this subscriber registration entry modification to the subscriber location register in the packet control node. The method further comprises to receive a notification of a subscriber registration entry modification from the subscriber location register in the packet control node and to modify the subscriber registration entry in the MSC accordingly.

According to a further aspect of the invention, a packet control node for coordinating subscriber registration entries of a subscriber in a subscriber location register in the packet control node and a subscriber location register in a Mobile Switching Centre, MSC, wherein the subscriber is registered into the subscriber location register in the MSC via the packet control node. The packet control node is capable to determine a trigger condition for modifying a subscriber registration entry in the subscriber location register in the packet control node, wherein if the trigger condition is met, to modify the subscriber registration entry and to send a notification of this subscriber registration entry modification to the subscriber location register in the MSC. The packet control node is further capable to receive a notification of a subscriber registration entry modification from the subscriber location register in the MSC and to modify the subscriber registration entry in the packet control node accordingly.

According to another aspect of the invention, a Mobile Switching Centre, MSC, for coordinating subscriber registration entries of a subscriber in a subscriber location register in the MSC and a subscriber location register in a packet control node, wherein the subscriber is registered into the subscriber location register in the MSC via the packet control node. The MSC is capable to determine a trigger condition for modifying a subscriber registration entry in the subscriber location register in the MSC, wherein if the trigger condition is met, to modify the subscriber registration entry and to send a notification of this subscriber registration entry modification to the subscriber location register in the packet control node. The MSC is further capable to receive a notification of a subscriber registration entry modification from the subscriber location register in the packet control node and to modify the subscriber registration entry in the MSC accordingly.

According to another aspect of the invention, a system for coordinating subscriber registration entries of a subscriber in two subscriber location registers; a subscriber location register in a Mobile Switching Centre, MSC, and a subscriber location register in a packet control node, wherein the subscriber is registered into the subscriber location register in the MSC via the packet control node. The system comprises the packet control node and the MSC node.

Also provided is a computer program product comprising program code portions to perform the steps of any of the methods and method aspects presented herein when the computer program product is executed by one or more processors. The computer program product may be stored on a computer-readable recording medium such as a semiconductor memory, hard-disk or optical disk. Also, the computer program product may be provided for download via a communication network.

The foregoing and other objects, features and advantages of the present invention will become more apparent in the following detailed description of embodiments of the invention illustrated in the accompanying drawings

BRIEF DESCRIPTION OF DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
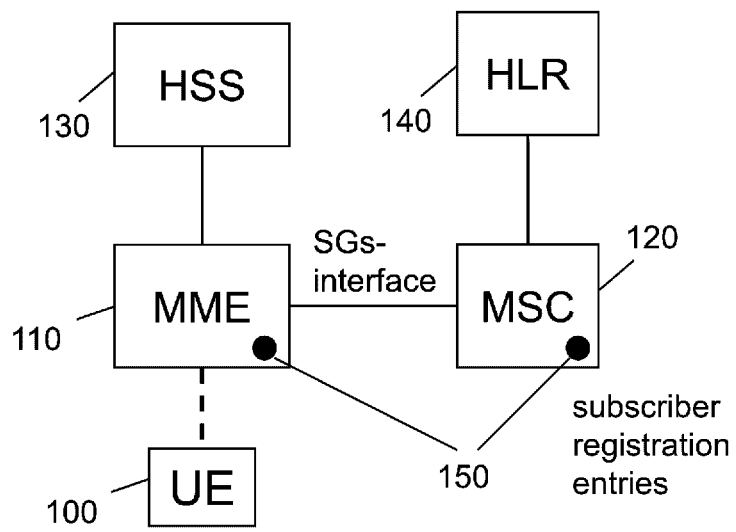
FIG. 1 shows an illustration of a first system for coordinating subscriber registration entries of a subscriber in two subscriber location registers.

In the following, a system, method, node and computer program for coordinating subscriber registration entries of a subscriber in two subscriber location registers according to the invention are described in more detail.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, MME, and SGSN. In this respect, the term "packet control node" particularly refers to MME and SGSN. Such control node may be a physical node comprising a dedicated hardware platform and a corresponding software application running on that hardware platform. The control node may also be implemented as a virtual application such as a Virtual Network Function (VNF), or a software container, instantiated in a general purpose data center. The latter would be commonly known as "running in a cloud".

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with humans but also with non-humans like animals, plants, or even machines (MTC/M2M). A UE may be equipped with a SIM (Subscriber Identity Module) comprising unique identities such as IMSI (International Mobile Subscriber Identity) and/or TMSI (Temporary Mobile Subscriber Identity) (or P-TMSI for SGSN or GUTI for MME) associated with the person using the UE such as a subscriber using the UE. The presence of a SIM within a UE customizes the UE uniquely with a subscription of the subscriber. Such subscriber may also use multiple devices/UEs at the same time.

Within the context of the present application, the term "subscriber" refers to a person having a service agreement with a service provider such as an operator. The subscriber may also be a legal entity such as a company operating a pool of MTC devices, and these devices operate independent from any human subscriber. In this case the MTC device is the direct receiver of the service while the service subscription is centrally with the company (indirect receiver of such service) operating the pool of MTC devices.

Within the context of the present application, the term "subscriber database", "central/global subscriber database" refers to a database run by the network operator to store the information related to the subscribers of a network run by the operator. A subscriber database can be for example a Home Location Register, HLR, or a Home Subscriber Server, HSS, or a combination of HLR and HSS. A subscriber database may also be internally structured into a front end part handling the signaling with the other network nodes of the communication network and a generic database for storage of the data according to data layered architecture principles. In contrast to the global subscriber database, some control nodes comprise also a local subscriber register for temporary storage of subscriber data. Such temporary subscriber register may also be called visited subscriber register or Visited Location Register (VLR).

Within the context of the present application, the term "subscriber registration entry" refers to an entry in a temporary/visited location register located within a control node. Such entry comprises for example a set of information related to the subscriber, information related to the UE used by the subscriber, a list of services that the subscriber is allowed to use and detailed configuration information for each of those services, but also dynamic information such as the latest known location of the UE and the attachment status.

Referring to FIG. 1, this figure shows a diagram illustrating a first system for coordinating subscriber registration entries of a subscriber in two subscriber location registers.

A UE 100 is roaming in a LTE radio coverage area (not shown) and is attaching to a MME 110. The MME 110 fetches subscriber data related to the subscriber using the UE 100 from the HSS 130 and stores them in a subscriber location register comprised by the MME 110. The subscriber data are stored as a subscriber registration entry 150 within the subscriber location register.

For example based on the current geographical area where the UE 100 is located (or alternatively based on a load sharing algorithm), the MME 110 determines a MSC 120 responsible for handling the CS telephony services for the subscriber. The MME 110 interfaces that MSC 120 by using a SGs-interface according to the 3GPP specifications. The MME 110 then registers the subscriber into the MSC 120 via SGs-interface procedures. The MSC 120, receiving such registration request from the MME 110, will fetch the subscriber data from the HLR 140 and stores them in a subscriber location register comprised by the MSC 120. The subscriber data are stored as a subscriber registration entry 150 within the subscriber location register. The subscriber location register in the MSC 120 is also called VLR. The HLR 140 and the HSS 130 comprise consistent data concerning the subscriber.

So the subscriber is registered into the subscriber location register in the MSC 120 via the MME 110 and there are two subscriber registration entries 150, the first located in the MME 110 and the second located in the MSC 120. So both nodes are aware of each other and for example if a terminating call is received by the MSC 120, the MSC 120 contacts the MME 110 for paging the UE 100.

Figure 2:
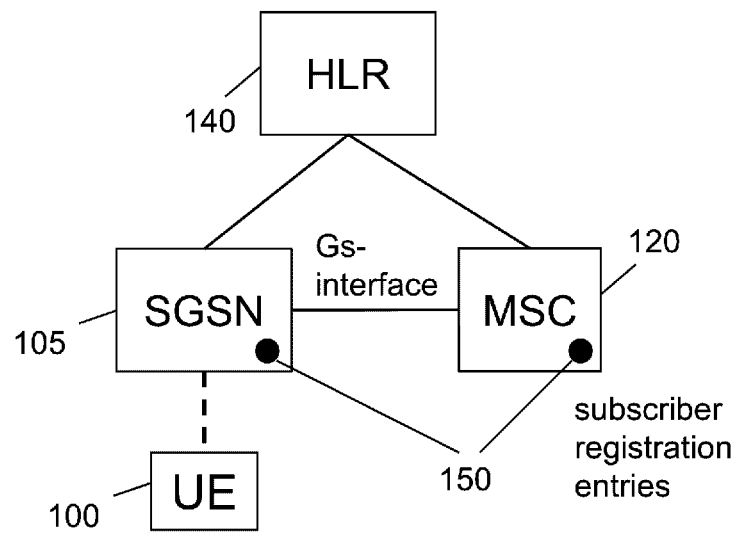
FIG. 2 shows an illustration of a second system for coordinating subscriber registration entries of a subscriber in two subscriber location registers.

Referring to FIG. 2, this figure shows an illustration of a second system for coordinating subscriber registration entries of a subscriber in two subscriber location registers.

A UE 100 is roaming in a GPRS or 3G radio network (not shown) and is attaching to a SGSN 105. The SGSN 105 fetches subscriber data related to the subscriber using the UE 100 from the HLR 140 and stores them in a subscriber location register comprised by the SGSN 105. The subscriber data are stored as a subscriber registration entry 150 within the subscriber location register.

For example based on the current geographical area where the UE 100 is located (or alternatively on a load sharing algorithm), the SGSN 105 determines a MSC 120 responsible for handling the CS telephony services for the subscriber. The SGSN 105 interfaces that MSC 120 by using a Gs-interface according to the 3GPP specifications. The SGSN 105 then registers the subscriber into the MSC 120 via Gs-interface procedures. The MSC 120, receiving such registration request from the SGSN 105, will fetch the subscriber data from the HLR 140 and stores them in a subscriber location register comprised by the MSC 120. The subscriber data are stored as a subscriber registration entry 150 within the subscriber location register. The subscriber location register in the MSC 120 and in the SGSN 105 is also called VLR.

So the subscriber is registered into the subscriber location register in the MSC 120 via the SGSN 105 and there are two subscriber registration entries 150, the first located in the SGSN 105 and the second located in the MSC 120. So both nodes are aware of each other and for example if a terminating call is received by the MSC 120, the MSC 120 contacts the SGSN 105 for paging the UE 100.

Figure 3A:
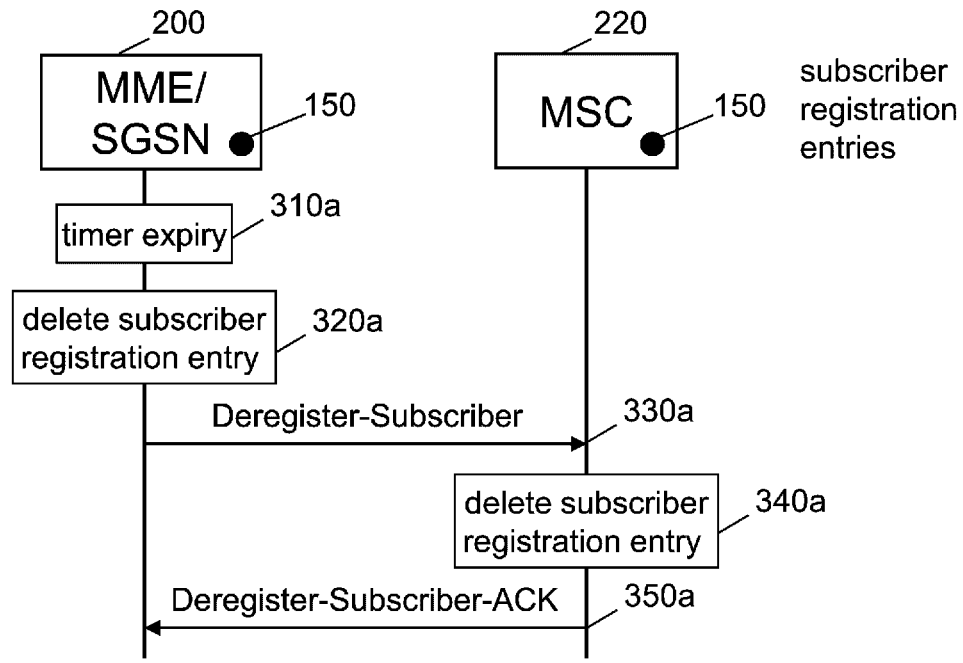
FIG. 3a shows a sequence diagram for coordinating subscriber registration entries of a subscriber in two subscriber location registers, coordination initiated from MME/SGSN, according to the invention.

Referring to FIG. 3a, this figure shows a sequence diagram for coordinating subscriber registration entries of a subscriber in two subscriber location registers, coordination initiated from MME/SGSN, according to the invention.

In order to coordinate the subscriber registration entry 150 in the MME or SGSN (from now on denoted as MME/SGSN 200) with the subscriber registration entry 150 in the MSC 220, at least one new protocol message is introduced. This new protocol message is exchanged between the MME 200 and the MSC 220 using the SGs-interface, or between the SGSN 200 and the MSC 220 using the Gs-interface. This new protocol message comprises at least an indication on which subscriber is concerned, which may be an IMSI (International Mobile Subscriber Identity). It may also comprise information what information element in that subscriber registration entry 150 shall be coordinated.

A corresponding new response message may be returned as a response to that new protocol message. The corresponding new response message may report on a success or a failure to coordinate the subscriber registration entry 150.

FIG. 3a illustrates the principles of the coordination by showing the example of a deregistration handling. It is clear to a person skilled in the art that deregistration handling is just one example for a coordination need between the two subscriber registration entries 150 in the MME/SGSN 200 and the MSC 220.

There is a timer running in the MME/SGSN 200 for supervising the validity of the subscriber registration entry 150 in the MME/SGSN 200. That timer may be a timer for automatic deregistration (for example timer 1508). If that timer expires 310a, the UE 100 has not have radio contact with the MME/SGSN 200 for a long time and it can safely be assumed that the UE 100 is not any longer located in the area handled by the MME/SGSN 200.

The MME/SGSN 200 then deletes 320a the subscriber registration entry 150 in the MME/SGSN 200. This deletion may mean the removal of the entire subscriber registration entry from the local subscriber register in the MME/SGSN 200. By alternative, the MME/SGSN 200 may perform a partial deletion of the subscriber registration entry and keep essential data for eventual reuse in case the subscriber will attach again. Then the MME/SGSN 200 sends a new protocol message for example called Deregister-Subscriber 330a to the MSC 220. The MSC 220, receiving that new message Deregister-Subscriber 330a, deletes 340a the subscriber registration entry 150 in the MSC 220. Also the MSC 220 may perform a partial deletion of the subscriber registration entry and keep essential data for eventual reuse in case the subscriber will attach again.

After successful deletion of the subscriber registration entry 150 in the MSC 220, the MSC 220 acknowledges 350a the deletion on the subscriber registration entry 150 by returning a new acknowledge protocol message 350a, for example called Deregister-Subscriber-ACK to the MME/SGSN 200. Since this Deregister-Subscriber-ACK message is a response to the message Deregister-Subscriber 330a, this message may comprise an indicator showing a successful coordinate the subscriber registration entry 150 or the indicator may show a failure of that coordination and may in addition also give more details on the reason for such failure. Instead of a Deregister-Subscriber-ACK message it may also be possible to send a different message in case of a failure, for example Deregister-Subscriber-NACK or Deregister-Subscriber-Error, wherein that NACK/Error message would comprise the failure indication.

The MME/SGSN 200 receives the new Deregister-Subscriber-ACK protocol message 350a, resulting in that both subscriber registration entries 150 are aligned.

If looking at the procedures from the perspective of the MME/SGSN 200, the MME/SGSN 200 is a packet control node and the procedure is a method for coordinating subscriber registration entries of a subscriber in a subscriber location register in the packet control node 200 and a subscriber location register in the MSC 220, wherein the subscriber is registered into the subscriber location register in the MSC 220 via the packet control node 200.

The method comprises to determine a trigger condition for modifying a subscriber registration entry 150 in the subscriber location register in the packet control node. In this example the trigger condition is the expiry of a timer supervising the validity of a subscriber registration entry 150 in the packet control node 200. The trigger condition for modifying the subscriber registration entry 150 may be a deregistration event causing the subscriber registration entry 150 to be deleted from the subscriber location register in the packet control node 200.

If the trigger condition is met, the subscriber registration entry 150 is modified, which may also be a deletion of the subscriber registration entry 150 in the packet control node 200.

Then the packet control node 200 sends a notification of this subscriber registration entry 150 modification or deletion to the subscriber location register in the MSC 220, in order to coordinate that change of the subscriber registration entry 150.

The packet control node 200 then receives an acknowledgement from the subscriber location register in the MSC 220.

So the MSC 220 is receiving a notification of a subscriber registration entry 150 modification from the subscriber location register in the packet control node 200 and modifying the subscriber registration entry 150 in the MSC 220 accordingly.

If looking at the procedures from the perspective of the MSC 220, the MSC 220 is a node for coordinating subscriber registration entries of a subscriber in a subscriber location register in the MSC 220 and a subscriber location register in a packet control node 200, wherein the subscriber is registered into the subscriber location register in the MSC 220 via the packet control node 200. The MSC 220 determines a trigger condition for modifying a subscriber registration entry 150 in the subscriber location register in the MSC 220. The trigger condition for modifying the subscriber registration entry 150 may be a deregistration event causing the subscriber registration entry 150 to be deleted from the subscriber location register in the MSC 220.

If the trigger condition is met, the subscriber registration entry 150 is modified which may also be a deletion of the subscriber registration entry 150 in the MSC 220.

Then the MSC 220 sends a notification of this subscriber registration entry 150 modification or deletion to the subscriber location register in the packet control node 200 in order to coordinate that change of the subscriber registration entry 150.

The MSC 220 then receives an acknowledgement from the subscriber location register in the packet control node 200.

So the packet control node 200 is receiving a notification of a subscriber registration entry 150 modification from the subscriber location register in the MSC 220 and modifying the subscriber registration entry 150 in the packet control node 200 accordingly.

Figure 3B:
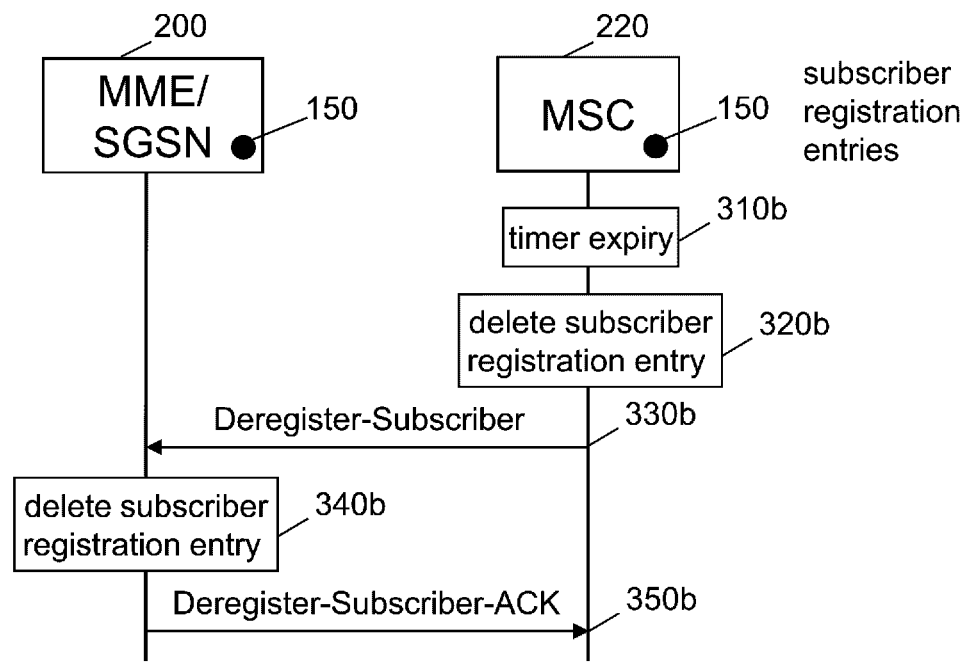
FIG. 3b shows a sequence diagram for coordinating subscriber registration entries of a subscriber in two subscriber location registers, coordination initiated from MSC, according to the invention.

Referring to FIG. 3b, this figure shows a sequence diagram for coordinating subscriber registration entries of a subscriber in two subscriber location registers, coordination initiated from MSC, according to the invention.

This sequence diagram corresponds to the sequence diagram shown in FIG. 3a, however, in FIG. 3b there is a timer running in the MSC 220 for supervising the validity of the subscriber registration entry 150 in the MSC 220.

That timer may be a timer for automatic deregistration (for example timer 1608). If that timer expires 310b, the UE 100 has not have radio contact with the MSC 220 for a long time and it can safely be assumed that the UE 100 is not any longer located in the area handled by the MSC 220.

As can be derived from the figure, the FIG. 3b sequence is a mirror image reproduction of the sequence of FIG. 3a and is therefore not repeated here for brevity. The description of FIG. 3a is correspondingly applicable for FIG. 3b.

Figure 4:
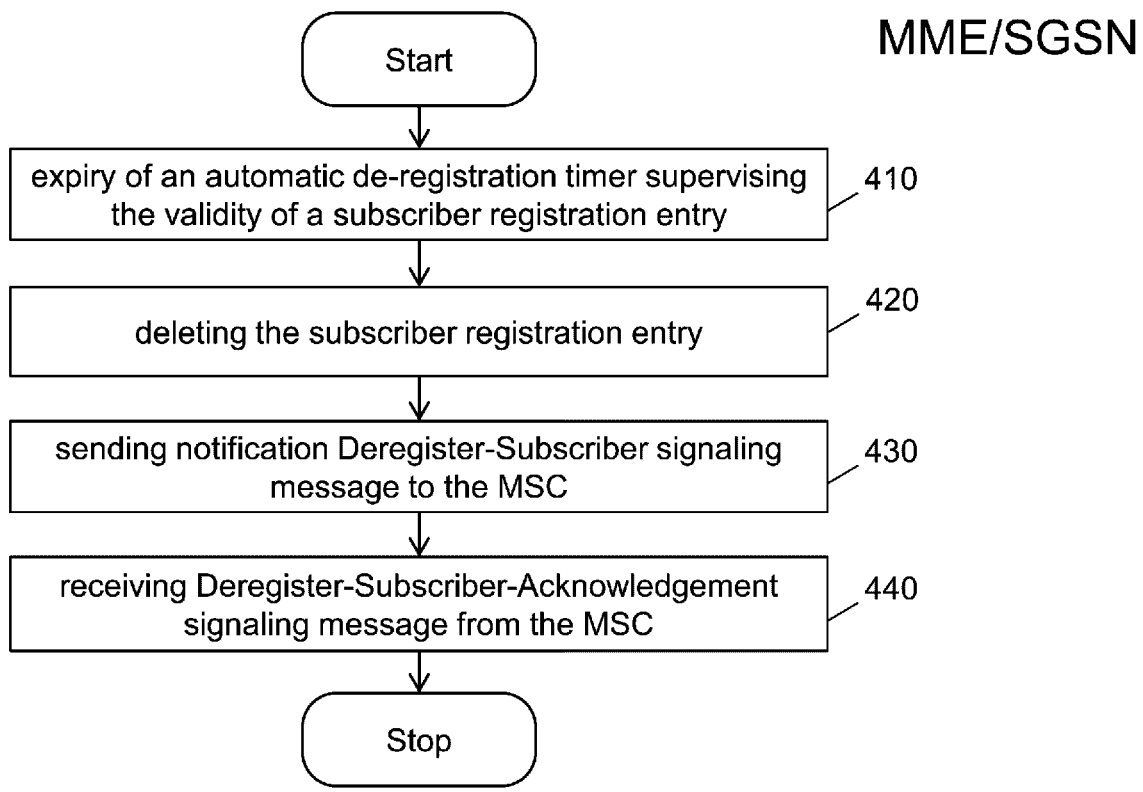
FIG. 4 shows a first flow diagram in a MME/SGSN for coordinating subscriber registration entries of a subscriber in two subscriber location registers according to the invention.

Referring to FIG. 4, this figure shows a first flow diagram in a MME/SGSN for coordinating subscriber registration entries of a subscriber in two subscriber location registers according to the invention.

This coordination case corresponds to the deregistration case as described above for FIG. 3, but now from the perspective of the packet control node 200.

The flow starts in step 410 at expiry of an automatic de-registration timer in the packet control node 200 supervising the validity of a subscriber registration entry 150.

Then in step 420 the packet control node 200 deletes the corresponding subscriber registration entry 150.

In step 430 the packet control node 200 sends a notification Deregister-Subscriber signaling message to the MSC 220.

Finally, in step 440 the packet control node 200 receives a Deregister-Subscriber-Acknowledgement signaling message from the MSC 220 confirming that the subscriber registration entries 150 have been aligned.

Figure 5:
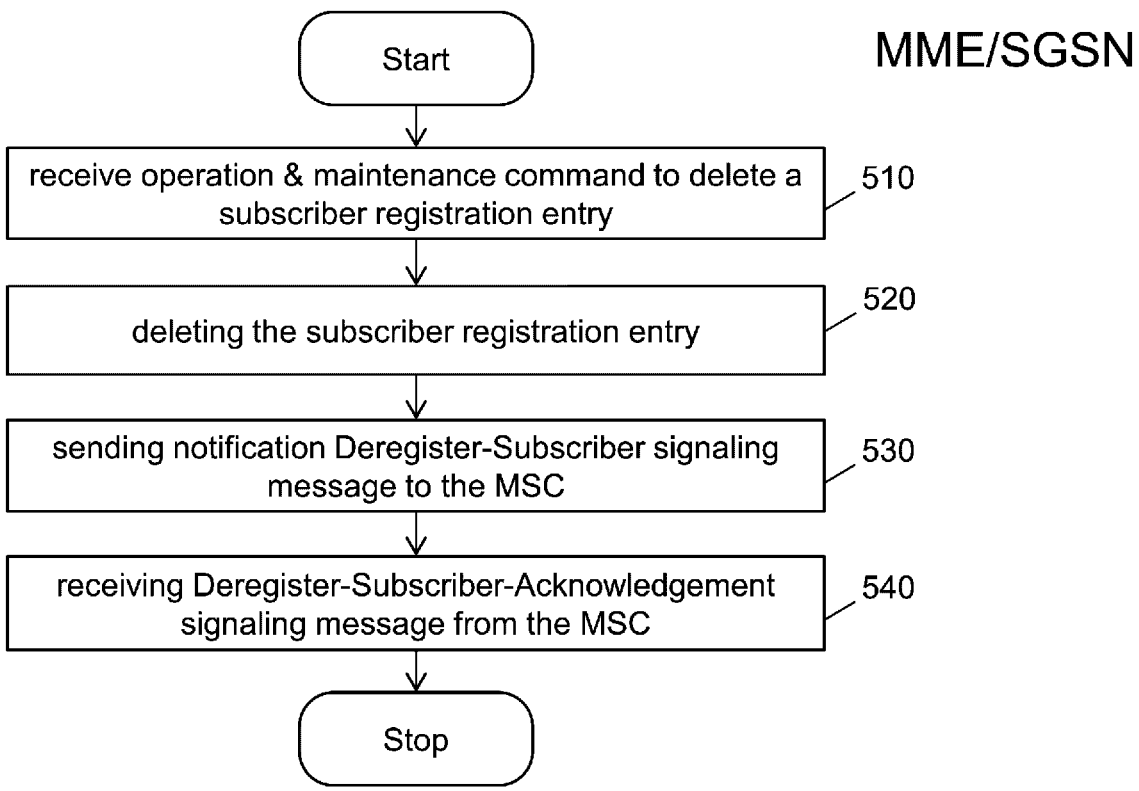
FIG. 5 shows a second flow diagram in a MME/SGSN for coordinating subscriber registration entries of a subscriber in two subscriber location registers according to the invention.

Referring to FIG. 5, this figure shows a second flow diagram in a MME/SGSN for coordinating subscriber registration entries of a subscriber in two subscriber location registers according to the invention.

Another example for a need to coordinate the subscriber registration entries 150 between the packet control node 200 and the MSC 220 is the case if the operator deletes a subscriber actively from the packet control node 200 by issuing a corresponding operation and maintenance command towards the packet control node 200.

The flow starts in step 510 when the packet control node 200 receives an operation & maintenance command to delete a subscriber registration entry 150.

In step 520 the packet control node 200 deletes the subscriber registration entry 150.

Then in step 530 the packet control node 200 sends a notification Deregister-Subscriber signaling message to the MSC 220.

Finally, in step 540 the packet control node 200 receives a Deregister-Subscriber-Acknowledgement signaling message from the MSC 220 confirming that the subscriber registration entries 150 have been aligned.

Figure 6:
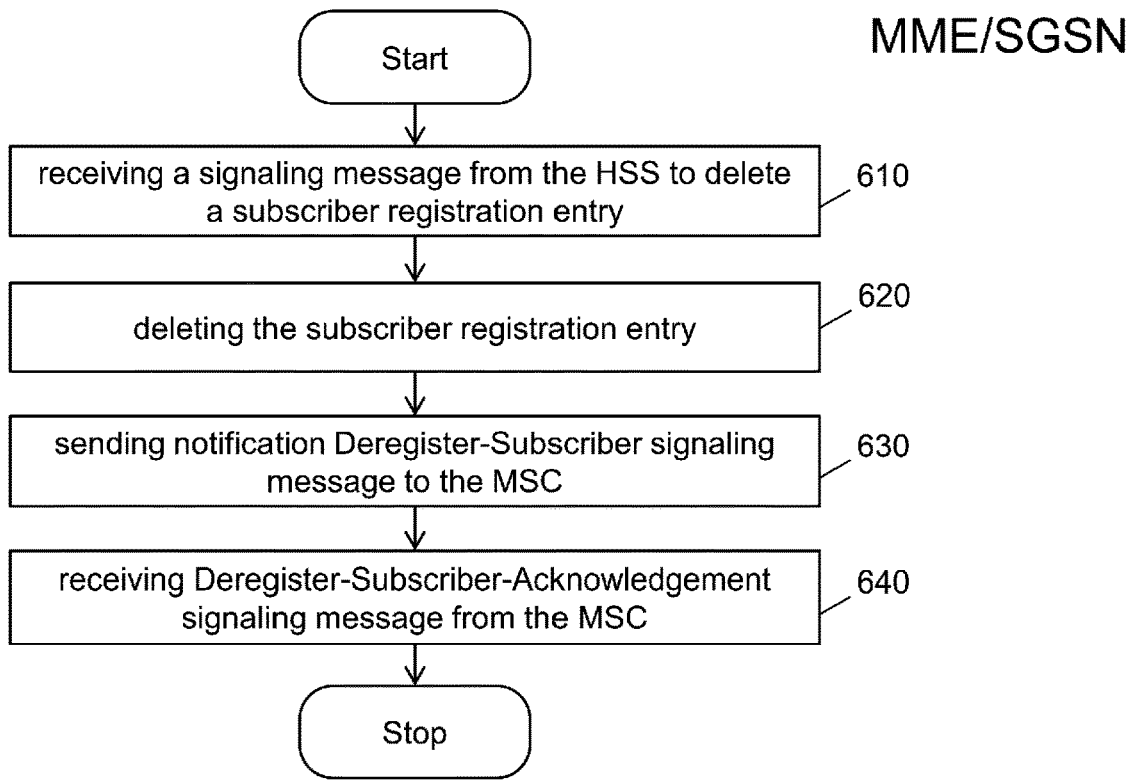
FIG. 6 shows a third flow diagram in a MME/SGSN for coordinating subscriber registration entries of a subscriber in two subscriber location registers according to the invention.

Referring to FIG. 6, this figure shows a third flow diagram in a MME/SGSN for coordinating subscriber registration entries of a subscriber in two subscriber location registers according to the invention.

Another example for a need to coordinate the subscriber registration entries 150 between the packet control node 200 and the MSC 220 is the case if the operator deletes a subscriber actively from the HSS 130 by issuing a corresponding operation and maintenance command towards the HSS 130. The HSS 130 then instructs the packet control node 200 to delete the subscriber registration entry 150 in the packet control node 200. This instruction may take the form of a signalling message.

The flow starts in step 610 when the packet control node 200 receives a signalling message instructing to delete a subscriber registration entry 150.

In step 620 the packet control node 200 deletes the subscriber registration entry 150. This deletion and the following steps may be postponed until the subscriber has completed her current packet transfer.

Then in step 630 the packet control node 200 sends a notification Deregister-Subscriber signaling message to the MSC 220.

Finally, in step 640 the packet control node 200 receives a Deregister-Subscriber-Acknowledgement signaling message from the MSC 220 confirming that the subscriber registration entries 150 have been aligned.

Figure 7:
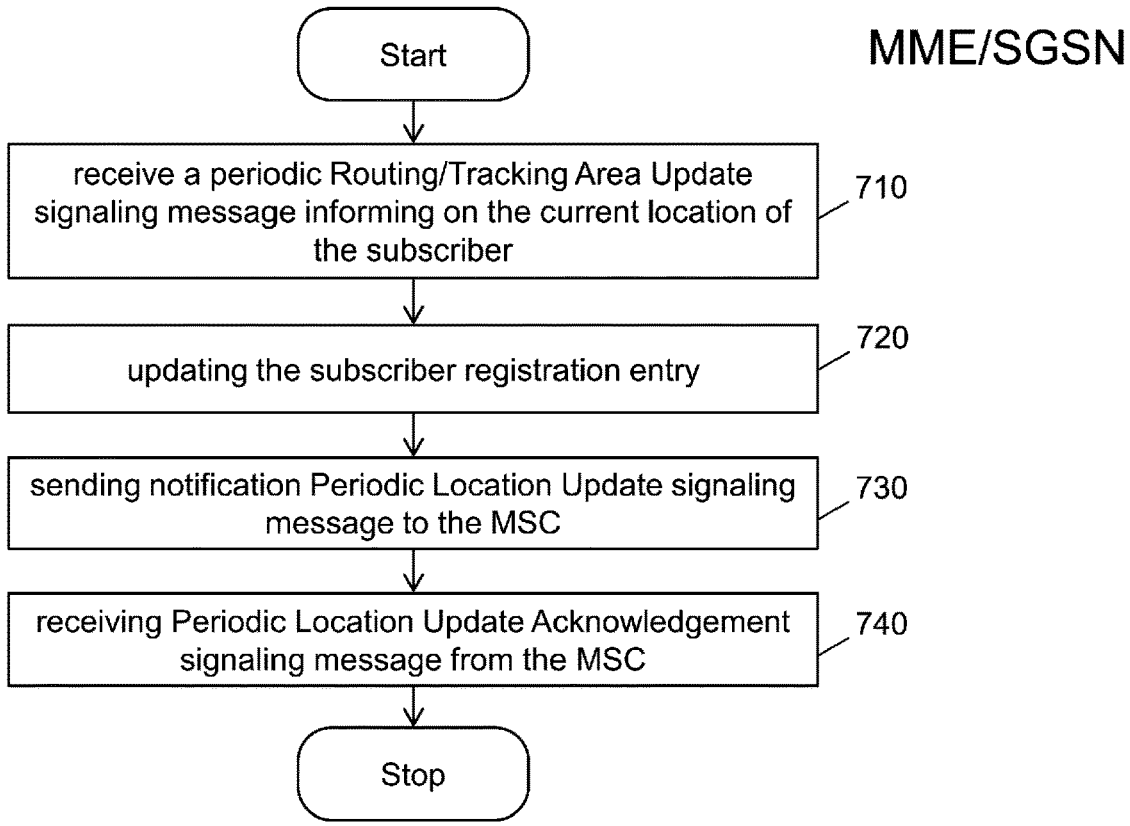
FIG. 7 shows a fourth flow diagram in a MME/SGSN for coordinating subscriber registration entries of a subscriber in two subscriber location registers according to the invention.

Referring to FIG. 7, this figure shows a fourth flow diagram in a MME/SGSN for coordinating subscriber registration entries of a subscriber in two subscriber location registers according to the invention.

Another example for a need to coordinate the subscriber registration entries 150 between the packet control node 200 and the MSC 220 is the case if the UE 100 has sent periodic information on the current location.

The flow starts in step 710 when the packet control node 200 receives a periodic Routing/Tracking Area Update signaling message informing on the current location of the subscriber.

In step 720 the packet control node 200 updates the subscriber registration entry 150 accordingly. When receiving such periodic information on the current location from the UE 100 the packet control node 200 also resets the automatic deregistration timer (for example timer 150S) running in the packet control node 200 supervising the validity of the subscriber registration entry.

Then in step 730 the packet control node 200 sends a notification Periodic Location Update signaling message to the MSC 220.

Finally, in step 740 the packet control node 200 receives a Periodic Location Update Acknowledgement signaling message from the MSC 220 confirming that the subscriber registration entries 150 have been aligned.

Figure 8:
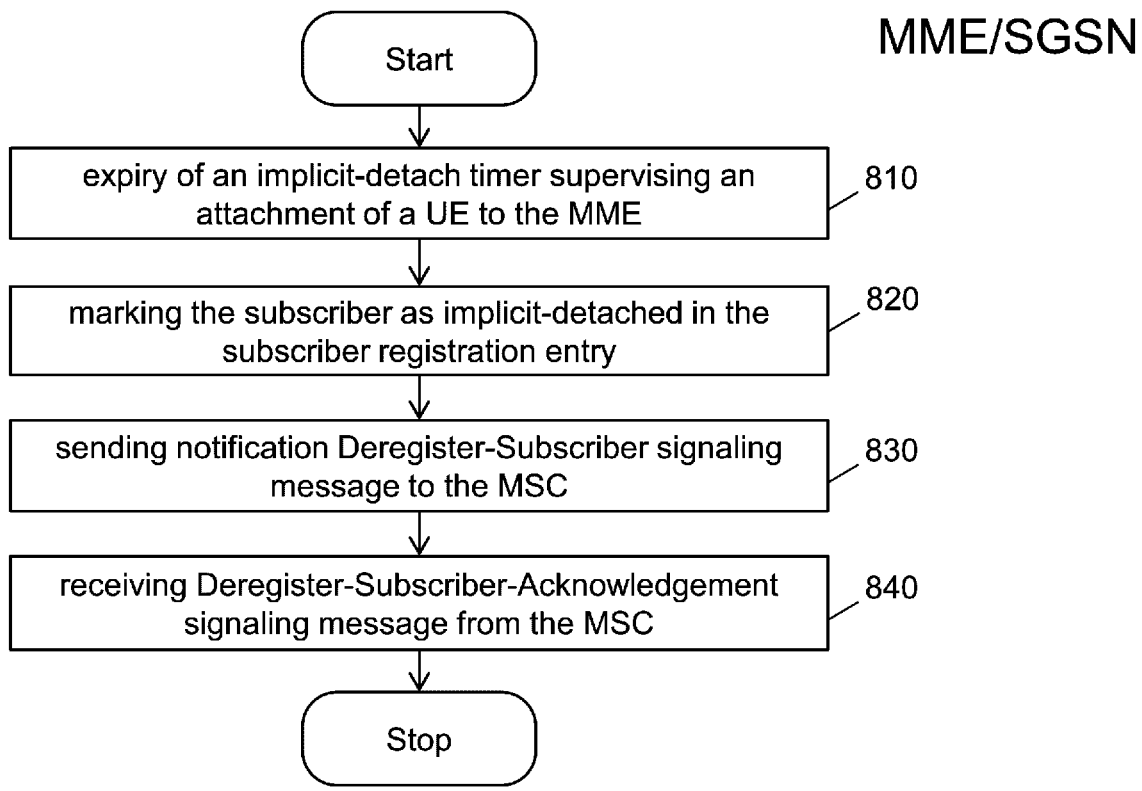
FIG. 8 shows a fifth flow diagram in a MME/SGSN for coordinating subscriber registration entries of a subscriber in two subscriber location registers according to the invention.

Referring to FIG. 8, this figure shows a fifth flow diagram in a MME/SGSN for coordinating subscriber registration entries of a subscriber in two subscriber location registers according to the invention.

Another example for a need to coordinate the subscriber registration entries 150 between the packet control node 200 and the MSC 220 is the case when the subscriber is marked implicitly detached in the subscriber registration entry 150 in the packet control node 200. The attachment status of the subscriber is typically supervised by a timer and if the UE 100 missed to send periodic information on the current location, the timer may expire shortly after.

The flow starts in step 810 at expiry of an implicit-detach timer in the packet control node 200 supervising the attachment of a UE 100.

Then in step 820 the packet control node 200 marks the subscriber as implicitly detached in the corresponding subscriber registration entry 150.

In step 830 the packet control node 200 sends a notification Deregister-Subscriber signaling message to the MSC 220.

Finally, in step 840 the packet control node 200 receives a Deregister-Subscriber-Acknowledgement signaling message from the MSC 220 confirming that the subscriber registration entries 150 have been aligned.

In the above example, a Deregister-Subscriber signaling message is sent to the MSC 220 causing the subscriber registration entry 150 in the MSC 220 to be deleted. By alternative the packet control node 200 may send an Implicit-Detach signaling message to the MSC 220 causing the subscriber registration entry 150 in the MSC 220 to be aligned to that attachment state. In this case the MSC 220 may return an Implicit-Detach-Acknowledgement signaling message to the packet control node 200.

Figure 9:
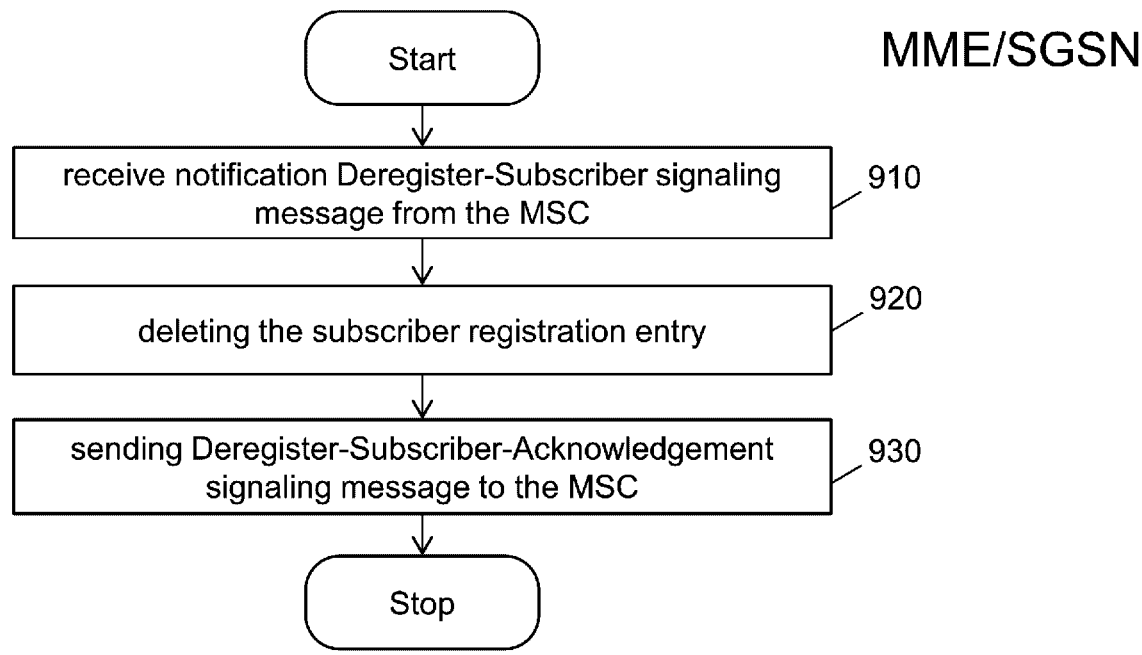
FIG. 9 shows a sixth flow diagram in a MME/SGSN for coordinating subscriber registration entries of a subscriber in two subscriber location registers according to the invention.

Referring to FIG. 9, this figure shows a sixth flow diagram in a MME/SGSN for coordinating subscriber registration entries of a subscriber in two subscriber location registers according to the invention.

Another example for a need to coordinate the subscriber registration entries 150 between the packet control node 200 and the MSC 220 is the case when a subscriber registration entry 150 in the MSC 220 is changed and the MSC 220 informs the packet control node 200 in order to align the subscriber registration entry 150 in the packet control node 200.

The flow starts in step 910 when the packet control node 200 receives a notification Deregister-Subscriber signaling message from the MSC 220.

Then in step 920 the packet control node 200 deletes the corresponding subscriber registration entry 150.

Finally in step 930 the packet control node 200 returns a Deregister-Subscriber-Acknowledgement signaling message to the MSC 220 confirming that the subscriber registration entry 150 has been deleted.

Figure 10:
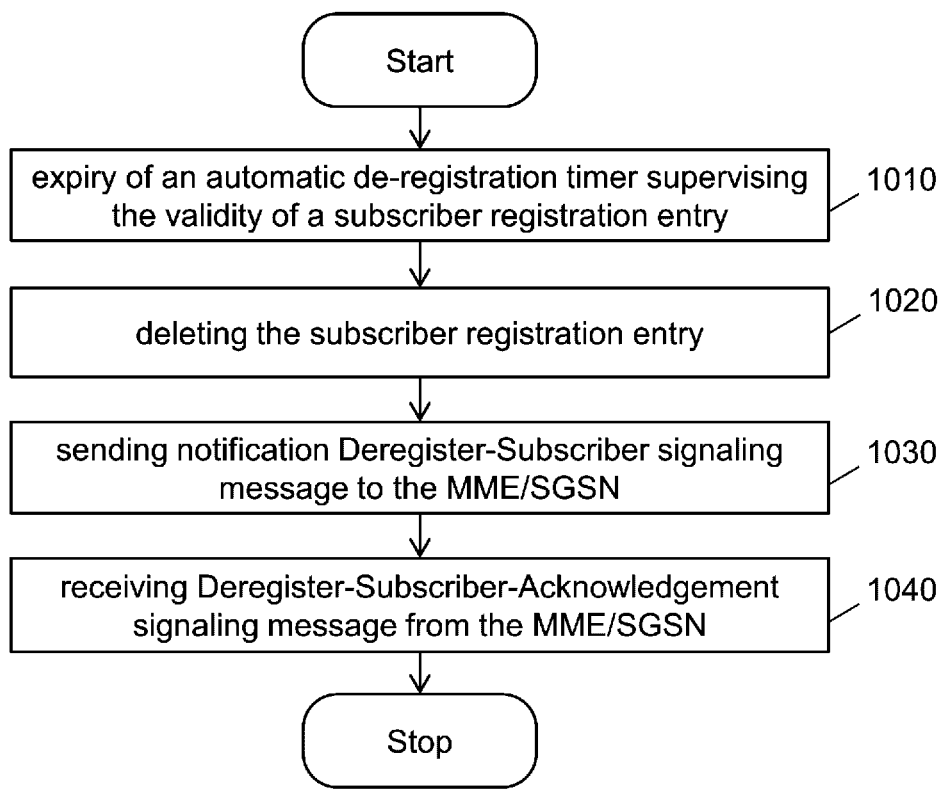
FIG. 10 shows a first flow diagram in a MSC for coordinating subscriber registration entries of a subscriber in two subscriber location registers according to the invention.

Referring to FIG. 10, this figure shows a first flow diagram in a MSC for coordinating subscriber registration entries of a subscriber in two subscriber location registers according to the invention.

This coordination case corresponds to the deregistration case as described above for FIG. 3, but now from the perspective of the MSC 220.

The flow starts in step 1010 at expiry of an automatic de-registration timer in the MSC 220 supervising the validity of a subscriber registration entry 150.

Then in step 1020 the MSC 220 deletes the corresponding subscriber registration entry 150.

In step 1030 the MSC 220 sends a notification Deregister-Subscriber signaling message to the packet control node 200.

Finally, in step 1040 the MSC 220 receives a Deregister-Subscriber-Acknowledgement signaling message from the packet control node 200 confirming that the subscriber registration entries 150 have been aligned.

Figure 11:
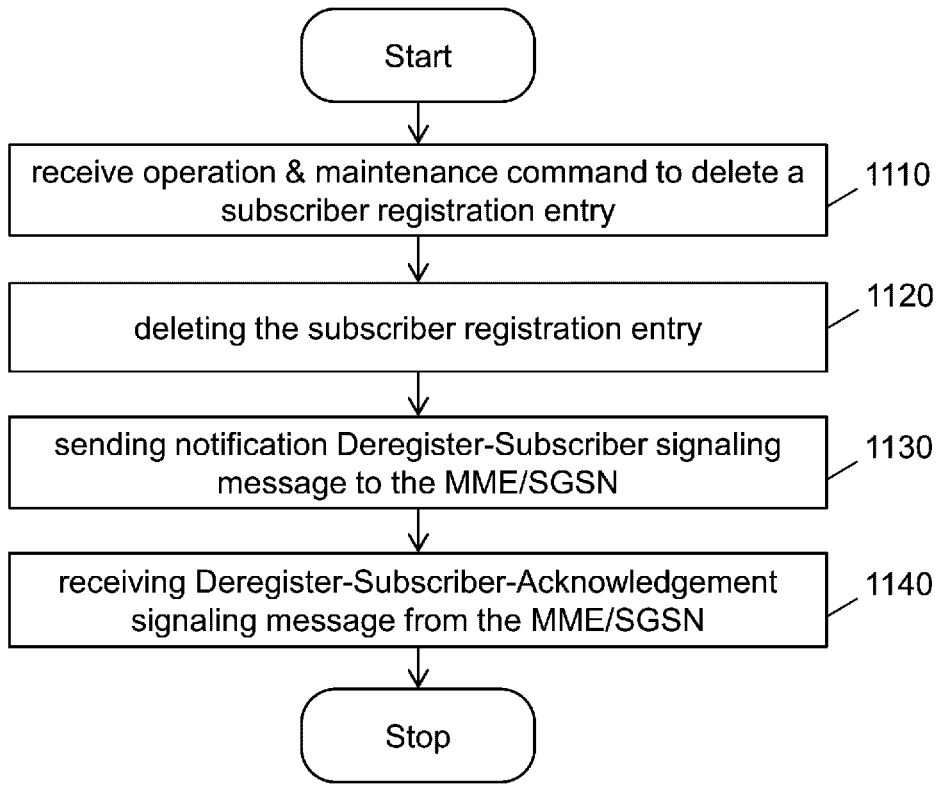
FIG. 11 shows a second flow diagram in a MSC for coordinating subscriber registration entries of a subscriber in two subscriber location registers according to the invention.

Referring to FIG. 11, this figure shows a second flow diagram in a MSC for coordinating subscriber registration entries of a subscriber in two subscriber location registers according to the invention.

Another example for a need to coordinate the subscriber registration entries 150 between the packet control node 200 and the MSC 220 is the case if the operator deletes a subscriber actively from the MSC 220 by issuing a corresponding operation and maintenance command towards the MSC 220.

The flow starts in step 1110 when the MSC 220 receives an operation & maintenance command to delete a subscriber registration entry 150.

In step 1120 the MSC 220 deletes the subscriber registration entry 150.

Then in step 1130 the MSC 220 sends a notification Deregister-Subscriber signaling message to the packet control node 200.

Finally, in step 1140 the MSC 220 receives a Deregister-Subscriber-Acknowledgement signaling message from the packet control node 200 confirming that the subscriber registration entries 150 have been aligned.

Figure 12:
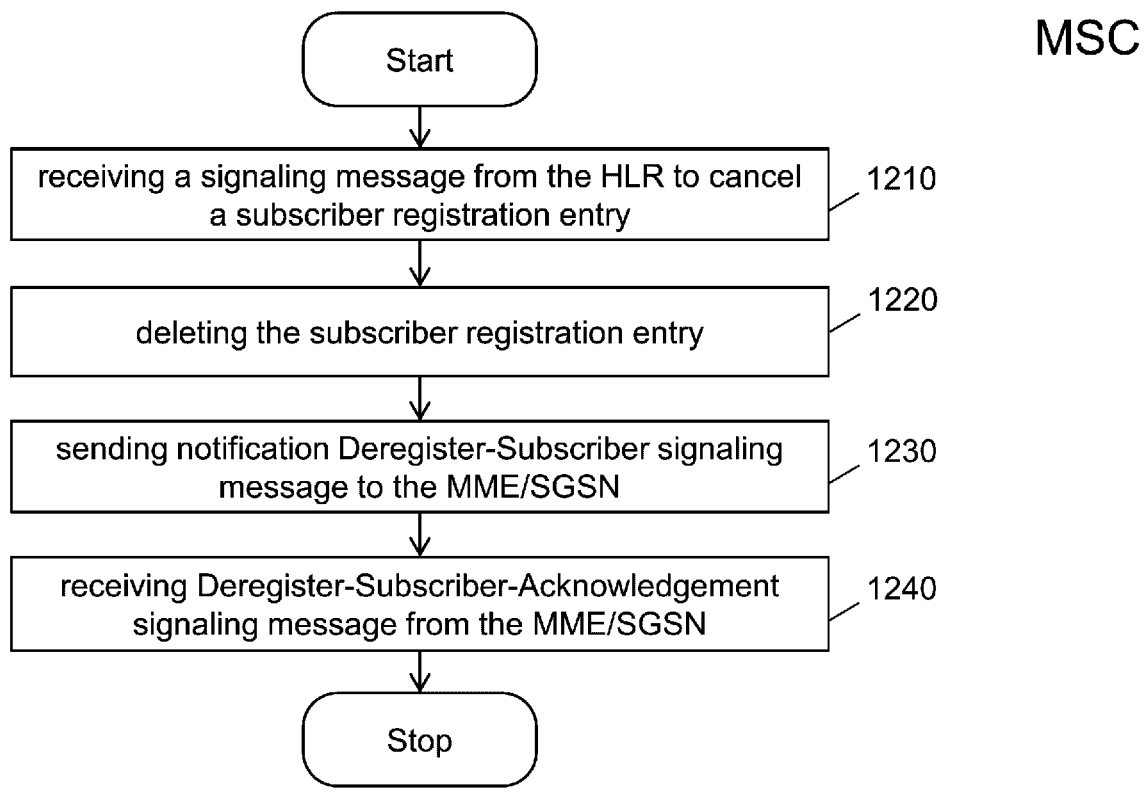
FIG. 12 shows a third flow diagram in a MSC for coordinating subscriber registration entries of a subscriber in two subscriber location registers according to the invention.

Referring to FIG. 12, this figure shows a third flow diagram in a MSC for coordinating subscriber registration entries of a subscriber in two subscriber location registers according to the invention.

Another example for a need to coordinate the subscriber registration entries 150 between the packet control node 200 and the MSC 220 is the case if the operator deletes a subscriber actively from the HLR 140 by issuing a corresponding operation and maintenance command towards the HLR 140. The HLR 140 then instructs the MSC 220 to delete the subscriber registration entry 150 in the MSC 220. This instruction may take the form of a signalling message.

The flow starts in step 1210 when the MSC 220 receives a signalling message instructing to delete a subscriber registration entry 150.

In step 620 the MSC 220 deletes the subscriber registration entry 150. This deletion and the following steps may be postponed until the subscriber has completed her current call or message transfer.

Then in step 1230 the MSC 220 sends a notification Deregister-Subscriber signaling message to the packet control node 200.

Finally, in step 1240 the MSC 220 receives a Deregister-Subscriber-Acknowledgement signaling message from the packet control node 200 confirming that the subscriber registration entries 150 have been aligned.

Figure 13:
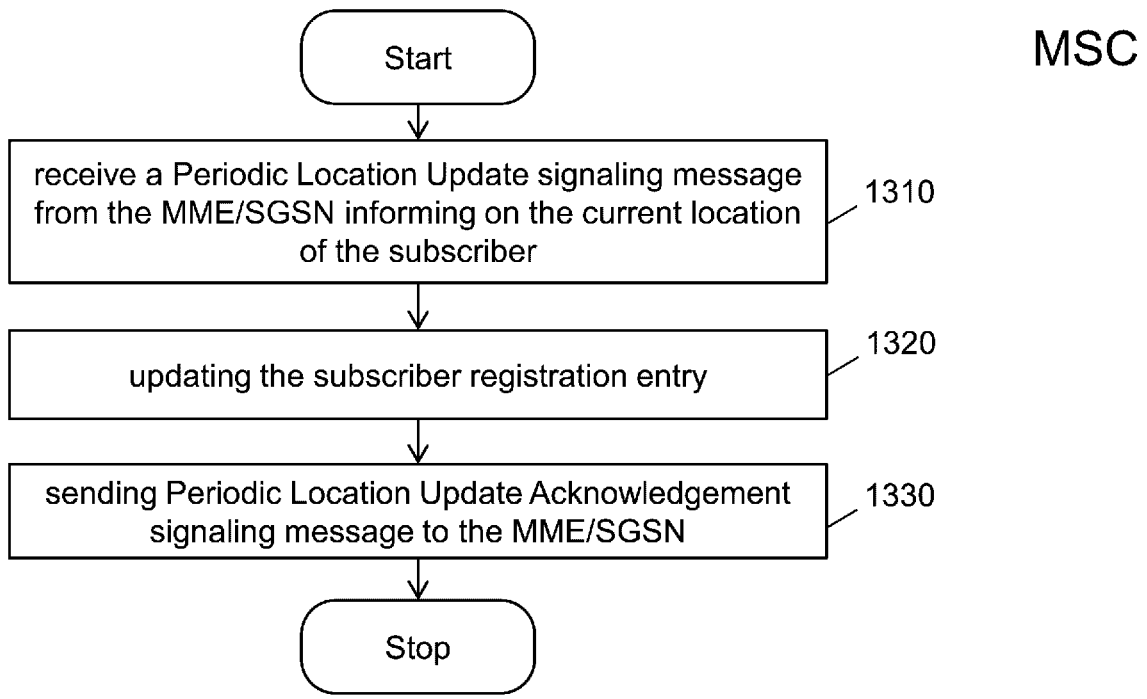
FIG. 13 shows a fourth flow diagram in a MSC for coordinating subscriber registration entries of a subscriber in two subscriber location registers according to the invention.

Referring to FIG. 13, this figure shows a fourth flow diagram in a MSC for coordinating subscriber registration entries of a subscriber in two subscriber location registers according to the invention.

Another example for a need to coordinate the subscriber registration entries 150 between the packet control node 200 and the MSC 220 is the case if the UE 100 has sent periodic information on the current location.

The flow starts in step 1310 when the MSC 220 receives a periodic Location Update signaling message informing on the current location of the subscriber.

In step 1320 the MSC 220 updates the subscriber registration entry 150 accordingly. When receiving such periodic information on the current location from the UE 100 the MSC 220 also resets the automatic deregistration timer (for example timer 1608) running in the MSC 220 supervising the validity of the subscriber registration entry.

Finally, in step 1330 the MSC 220 sends a Periodic Location Update Acknowledgement signaling message confirming that the subscriber registration entries 150 have been aligned.

Figure 14:
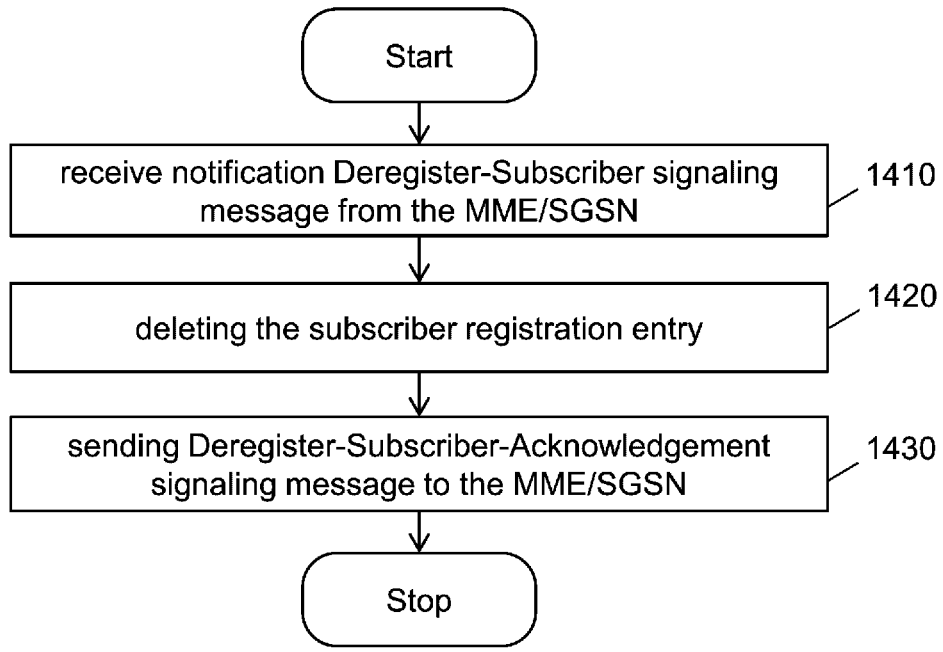
FIG. 14 shows a fifth flow diagram in a MSC for coordinating subscriber registration entries of a subscriber in two subscriber location registers according to the invention.

Referring to FIG. 14, this figure shows a fifth flow diagram in a MSC for coordinating subscriber registration entries of a subscriber in two subscriber location registers according to the invention.

Another example for a need to coordinate the subscriber registration entries 150 between the packet control node 200 and the MSC 220 is the case when a subscriber registration entry 150 in the packet control node 200 is changed and the packet control node 200 informs the MSC 220 in order to align the subscriber registration entry 150 in the MSC 220.

The flow starts in step 1410 when the MSC 220 receives a notification Deregister-Subscriber signaling message from the packet control node 200.

Then in step 1420 the MSC 220 deletes the corresponding subscriber registration entry 150.

Finally in step 1430 the MSC 220 returns a Deregister-Subscriber-Acknowledgement signaling message to the packet control node 200 confirming that the subscriber registration entry 150 has been deleted.

Figure 15:
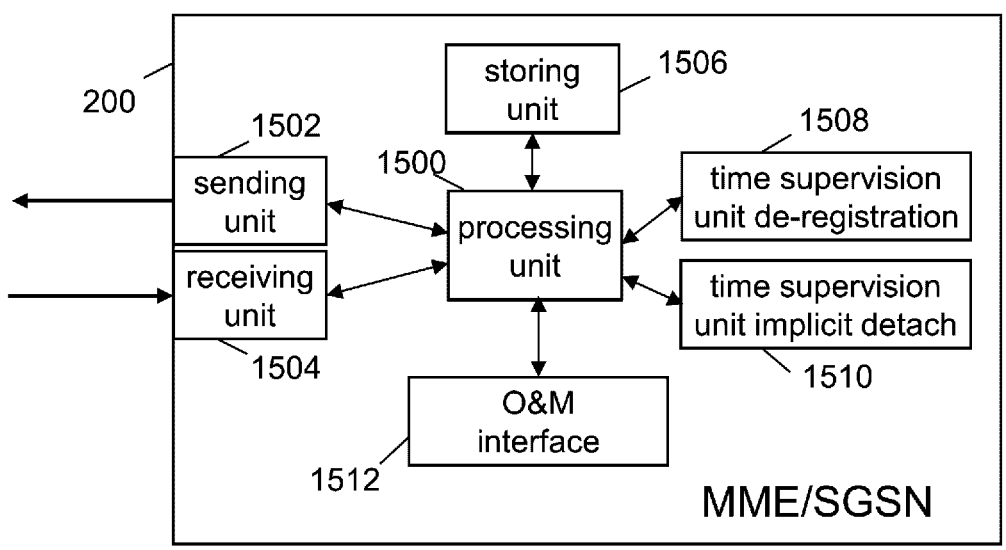
FIG. 15 shows a block diagram illustrating a packet control node for coordinating subscriber registration entries of a subscriber in two subscriber location registers according to the invention.

Referring to FIG. 15, this figure shows a block diagram illustrating a packet control node for coordinating subscriber registration entries of a subscriber in two subscriber location registers according to an embodiment. The illustrated entity may correspond to the MME/SGSN 200. The packet control node 200 may be adapted to perform one or more steps of the above described method shown in FIGS. 4 to 9.

The MME/SGSN 200 may comprise a number of functional units, which are described in further detail below and which are adapted to perform respective method steps.

A processing unit 1500 of the MME/SGSN 200 may be adapted to execute steps for coordinating subscriber registration entries of a subscriber in two subscriber location registers according to the invention. The processing unit 1500 also handles a trigger condition for modifying a subscriber registration entry in the subscriber location register in the MME/SGSN 200. If the trigger condition is met, the processing unit 1500 modifies the subscriber registration entry and composes a notification of this subscriber registration entry modification for delivery to the subscriber location register in the MSC. The processing unit 1500 interacts with all other units of the MME/SGSN 200.

In a practical implementation the processing unit 1500 may be one processor taking care of all the above functions, or may also be distributed over more than one processor, wherein the functions are distributed over the available processors.

The MME/SGSN 200 may further comprise a sending unit 1502 and a receiving unit 1504 via which the MME/SGSN 200 can communicate with other physical entities such as the MSC 220, the HSS 130, or the radio access network. The sending unit 1502 may send out signaling messages composed by the processing unit 1500. The receiving unit 1504 may receive signaling messages from those external entities above and forward the received signaling messages to the processing unit 1500 for decoding and/or dispatching.

The MME/SGSN 200 may also comprise a storing unit 1506 for storing information related to the coordination of subscriber registration entries of a subscriber in two subscriber location registers. The storing unit 1506 may store the actual subscriber registration entries of the MME/SGSN 200. The storing unit 1506 may be a pure software functional module such as a SQL database software module. The storing unit 1506 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1506 may be used by the processing unit 1500 to store information, for example program code or subscriber registration entries.

The MME/SGSN 200 may also comprise a time supervision unit 1508 for handling deregistration supervision tasks. This time supervision unit 1508 for deregistration supervision may implement the deregistration timer used to time supervise the automatic deregistration. In order to clean up the location register in the MME/SGSN 200, this timer supervises the validity of the subscriber registration entry. For example if a subscriber registration entry is in implicitly detached state for a longer period of time, the subscriber registration entry may be automatically deleted and the subscriber becomes deregistered. This automatic deregistration timer may be reset each time a radio contact with the UE is established, for example a periodic update on the current location. A timer may for example be implemented by a periodic interrupt signal from a system clock and a counter, or by a processor clock of the procession unit 1500 and a shift register. A timer in the time supervision unit 1508 may be instantiated, started, stopped, reset, and removed by instructions from the procession unit 1500.

The MME/SGSN 200 may also comprise a time supervision unit 1510 for handling implicit detach supervision tasks. This time supervision unit 1510 for handling implicit detach supervision may implement the implicit detach timer used to time supervise the implicit detach state in the subscriber registration entry. The attachment status of a subscriber is typically supervised by a timer and if the UE 100 misses to send periodic information on the current location, the implicit detach timer may expire shortly after. This timer may also reset each time a radio contact with the UE is established. A timer may for example be implemented by a periodic interrupt signal from a system clock and a counter, or by a processor clock of the procession unit 1500 and a shift register. A timer in the time supervision unit 1510 may be instantiated, started, stopped, reset, and removed by instructions from the processing unit 1500.

The MME/SGSN 200 may further comprise an operation and maintenance interface 1512. This operation and maintenance interface 1512 allows the operator of the MME/SGSN 200 to issue commands directly onto the MME/SGSN 200, for example commands for deletion of a subscriber registration entry in the subscriber location register.

Figure 16:
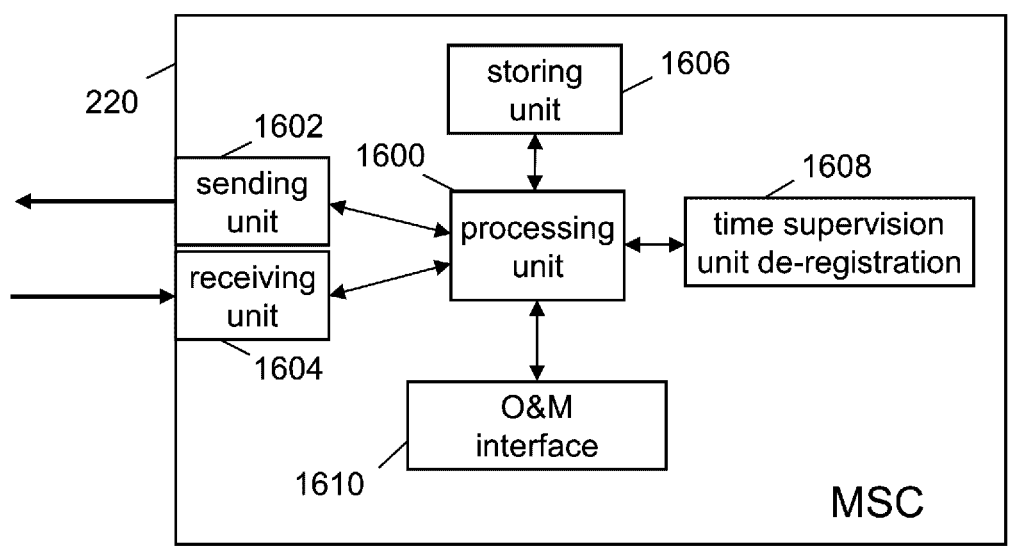
FIG. 16 shows a block diagram illustrating a MSC coordinating subscriber registration entries of a subscriber in two subscriber location registers according to the invention.

Referring to FIG. 16, this figure shows a block diagram illustrating a MSC coordinating subscriber registration entries of a subscriber in two subscriber location registers according to an embodiment. The illustrated entity may correspond to the MSC 220. The MSC 220 may be adapted to perform one or more steps of the above described method shown in FIGS. 10 to 14.

The MSC 220 may comprise a number of functional units, which are described in further detail below and which are adapted to perform respective method steps.

A processing unit 1600 of the MSC 220 may be adapted to execute steps for coordinating subscriber registration entries of a subscriber in two subscriber location registers according to the invention. The processing unit 1600 also handles a trigger condition for modifying a subscriber registration entry in the subscriber location register in the MSC 220. If the trigger condition is met, the processing unit 1600 modifies the subscriber registration entry and composes a notification of this subscriber registration entry modification for delivery to the subscriber location register in the MME/SGSN 200. The processing unit 1600 interacts with all other units of the MSC 220.

In a practical implementation the processing unit 1600 may be one processor taking care of all the above functions, or may also be distributed over more than one processor, wherein the functions are distributed over the available processors.

The MSC 220 may further comprise a sending unit 1602 and a receiving unit 1604 via which the MSC 220 can communicate with other physical entities such as the MME/SGSN 200 or the HLR 140. The sending unit 1602 may send out signaling messages composed by the processing unit 1600. The receiving unit 1604 may receive signaling messages from those external entities above and forward the received signaling messages to the processing unit 1600 for decoding and/or dispatching.

The MSC 220 may also comprise a storing unit 1606 for storing information related to the coordination of subscriber registration entries of a subscriber in two subscriber location registers. The storing unit 1606 may store the actual subscriber registration entries of the MSC 220. The storing unit 1606 may be a pure software functional module such as a SQL database software module. The storing unit 1606 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1606 may be used by the processing unit 1600 to store information, for example program code or subscriber registration entries.

The MSC 220 may also comprise a time supervision unit 1608 for handling deregistration supervision tasks. This time supervision unit 1608 for deregistration supervision may implement the deregistration timer used to time supervise the automatic deregistration. In order to clean up the location register in the MSC 220, this timer supervises the validity of the subscriber registration entry. For example if a subscriber registration entry is in implicitly detached state for a longer period of time, the subscriber registration entry is automatically deleted and the subscriber becomes deregistered. This automatic deregistration timer may be reset each time a radio contact with the UE is established, for example a periodic update on the current location. A timer may for example be implemented by a periodic interrupt signal from a system clock and a counter, or by a processor clock of the procession unit 1600 and a shift register. A timer in the time supervision unit 1608 may be instantiated, started, stopped, reset, and removed by instructions from the processing unit 1600.

The MSC 220 may further comprise an operation and maintenance interface 1610. This operation and maintenance interface 1610 allows the operator of the MSC 220 to issue commands directly onto the MSC 220, for example commands for deletion of a subscriber registration entry in the subscriber location register.

According to another embodiment, a computer program is provided. The computer program may be executed by the processing units 1500 and/or 1600 of the above mentioned entities 200 and/or 220 respectively such that a method for coordination of subscriber registration entries of a subscriber in two subscriber location registers with reference to FIGS. 4 to 14 may be carried out or be controlled. In particular, the entities 200 and/or 220 may be caused to operate in accordance with the above described method by executing the computer program.

The computer program may be embodied as computer code, for example of a computer program product. The computer program product may be stored on a computer readable medium, for example a disk or the storing unit 1506 and/or 1606 of the entities 200 and/or 220, or may be configured as downloadable information.

One or more embodiments as described above may enable at least one of the following technical effects:
- coordination and alignment of the subscriber registration entries
- no manual interaction required from the operator
- consistent, automatic clean-up of both location registers The fact that the two subscriber location registers are aligned can also be utilized to compensate for a node failure with loss of data in one of the subscriber location registers. For example there is a first subscriber location register in the MME/SGSN 200 and a second subscriber location register in a MSC 220. The MSC 220 suffers a node failure and loses all the data in its subscriber location register. In this case a periodic location update signalling message (such as 1310) triggers the MSC 220 to connect the subscriber again and to restore the subscriber data.

The same mechanism can be applied in case of failure in the MME/SGSN 200.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a packet control node for coordinating subscriber registration entries of a subscriber in a subscriber location register in the packet control node and a subscriber location register in a Mobile Switching Centre (MSC) wherein the subscriber is registered into the subscriber location register in the MSC via the packet control node, the method comprising:
  determining a trigger condition for modifying a subscriber registration entry in the subscriber location register in the packet control node; and wherein if the trigger condition is met, modifying the subscriber registration entry and sending a notification of this subscriber registration entry modification to the subscriber location register in the MSC; and
  receiving a notification of a subscriber registration entry modification from the subscriber location register in the MSC and modifying the subscriber registration entry in the packet control node accordingly, wherein the notification of the subscriber registration entry modification from the subscriber location register in the MSC is an indication to de-register the subscriber.

2. The method of claim 1, wherein the trigger condition for modifying the subscriber registration entry is a de-registration event causing the subscriber registration entry to be deleted from the subscriber location register in the packet control node.

3. The method of claim 2, wherein the de-registration event is an expiry of an automatic de-registration timer supervising the validity of the subscriber registration entry.

4. The method of claim 2, wherein the de-registration event is a manual de-registration triggered by operation and maintenance command.

5. The method of claim 2, wherein the de-registration event is a location cancellation signaling message received from a Home Subscriber Server (HSS).

6. The method of claim 1, wherein the trigger condition for modifying the subscriber registration entry is a periodic information on the current location of the subscriber.

7. The method of claim 1, wherein the trigger condition for modifying the subscriber registration entry is an expiry of an implicit detach timer supervising the attachment status of the subscriber.

8. The method of claim 1, wherein the packet control node is a Mobility Management Entity (MME) or a Serving GPRS Support Node (SGSN).

9. A method in a Mobile Switching Center (MSC) for coordinating subscriber registration entries of a subscriber in a subscriber location register in the MSC and a subscriber location register in a packet control node, wherein the subscriber is registered into the subscriber location register in the MSC via the packet control node, the method comprising:
  determining a trigger condition for modifying a subscriber registration entry in the subscriber location register in the MSC, wherein if the trigger condition is met, modifying the subscriber registration entry and sending a notification of this subscriber registration entry modification to the subscriber location register in the packet control node, wherein the notification of the subscriber registration entry modification, from the subscriber location register in the MSC to the packet control node, is an indication to de-register the subscriber; and
  receiving a notification of a subscriber registration entry modification from the subscriber location register in the packet control node and modifying the subscriber registration entry in the MSC accordingly.

10. The method of claim 9, wherein the trigger condition for modifying the subscriber registration entry is a de-registration event causing the subscriber registration entry to be deleted from the subscriber location register in the MSC.

11. The method of claim 10, wherein the de-registration event is an expiry of an automatic de-registration timer supervising the validity of the subscriber registration entry.

12. The method of claim 10, wherein the de-registration event is a manual de-registration triggered by operation and maintenance command.

13. The method of claim 10, wherein the de-registration event is a location cancellation signaling message received from a Home Location Register (HLR).

14. The method of claim 9, wherein the notification of a subscriber registration entry modification received from the subscriber location register in the packet control node is a periodic information on the current location of the subscriber.

15. The method of claim 9, wherein the notification of a subscriber registration entry modification received from the subscriber location register in the packet control node is an indication to de-register the subscriber.

16. The method of claim 9, wherein the packet control node is a Mobility Management Entity (MME) or a Serving GPRS Support Node (SGSN).

17. The method of claim 9, wherein the interface between the MSC and the packet control node is a Gs-interface or an SGs-interface according to the 3GPP standard.

18. A packet control node for coordinating subscriber registration entries of a subscriber in a subscriber location register in the packet control node and a subscriber location register in a Mobile Switching Centre (MSC) wherein the subscriber is registered into the subscriber location register in the MSC via the packet control node, the packet control node comprising:
  a processor; and
  a memory circuit operatively coupled to the processor and storing program code for execution by the processor, whereby the packet control node is configured to:
    determine a trigger condition for modifying a subscriber registration entry in the subscriber location register in the packet control node, and, responsive to determining that the trigger condition is met, modify the subscriber registration entry and send a notification of this subscriber registration entry modification to the subscriber location register in the MSC; and
    receive a notification of a subscriber registration entry modification from the subscriber location register in the MSC and modify the subscriber registration entry in the packet control node accordingly, wherein the notification of the subscriber registration entry modification from the subscriber location register in the MSC is an indication to de-register the subscriber.

19. A Mobile Switching Centre (MSC) for coordinating subscriber registration entries of a subscriber in a subscriber location register in the MSC and a subscriber location register in a packet control node, wherein the subscriber is registered into the subscriber location register in the MSC via the packet control node, the MSC comprising:
  a processor; and
  a memory circuit operatively coupled to the processor and storing program code for execution by the processor, whereby the MSC is configured to:
    determine a trigger condition for modifying a subscriber registration entry in the subscriber location register in the MSC, and, responsive to determining that the trigger condition is met, modify the subscriber registration entry and send a notification of this subscriber registration entry modification to the subscriber location register in the packet control node, wherein the notification of the subscriber registration entry modification, from the subscriber location register in the MSC to the packet control node, is an indication to de-register the subscriber; and receive a notification of a subscriber registration entry modification from the subscriber location register in the packet control node and modify the subscriber registration entry in the MSC accordingly.

* * * * *